United States Patent [19]

Rueger

[11] 3,918,092

[45] Nov. 4, 1975

[54] PUSH-THREADING TAPE IN A HELICAL PATH

[75] Inventor: William J. Rueger, Longmont, Colo.

[73] Assignee: International Business Machines Corporation, Armonk, N.Y.

[22] Filed: Apr. 25, 1974

[21] Appl. No.: 464,260

[52] U.S. Cl. .......................... 360/85; 226/7; 226/91; 226/97; 242/182; 242/195

[51] Int. Cl.² .......................................... B65H 17/32

[58] Field of Search ............ 226/7, 91, 97; 242/182, 242/195; 360/84, 85, 95

[56] References Cited

UNITED STATES PATENTS

| | | | |
|---|---|---|---|
| 3,134,527 | 5/1964 | Willis | 226/97 |
| 3,398,913 | 8/1968 | Orlando | 226/97 X |
| 3,758,009 | 9/1973 | Magahiro | 242/195 X |
| 3,823,895 | 7/1974 | Jones | 242/195 X |

*Primary Examiner*—Richard A. Schacher
*Attorney, Agent, or Firm*—Homer L. Knearl

[57] ABSTRACT

A wide magnetic tape is self-threaded about a helical path containing a rotating head by pushing the tape along the channelized helical path. The supply spool acts as the pushing force on the tape to push the tape through the channelized path. Air jets in the spool cavity provide a large flow of air to hold the tape against the spool. Thus, when the spool unwinds, it pushes the tape out of the spool cavity rather than unwinding in the spool cavity. To prevent excessive flutter of the tape in the channelized path caused by the large flow of air in the spool cavity, the throat of the cavity connecting to the tape path is constricted. Also, large vents are provided out of the spool cavity at the throat to bleed off the large air flow.

7 Claims, 6 Drawing Figures

PUSH-THREADING TAPE IN A HELICAL PATH

CROSS-REFERENCE TO RELATED APPLICATION

Filed simultaneously herewith is copending application Ser. No. 464,259 entitled "Control for Self-Threading Tape in a Helical path," invented by S. P. Cloud et al. This copending commonly assigned application is directed to control of the threading apparatus shown in the present application.

BACKGROUND OF THE INVENTION

Self-threading in the rotating head technology is not as highly developed as in the conventional data processing tape recorders. This is undoubtedly due to the very circuitous nature of the path which must be threaded to wrap the tape about the rotating head.

Typically, threading tape about a rotating head has been accomplished by mechanically pulling the tape along the circuitous path. This requires a special leader on the tape that may be engaged by the mechanism for pulling the tape through the path. Attaching a leader to a tape on the reel or spool is undesirable because it increases the cost of a reel of tape which is a large volume item for users.

A variation on mechanically threading tape is to mechanically lift the tape in a loop over the mandrel containing the rotating head. The lift arms are then retracted allowing the tape to collapse about the mandrel. Such a mechanism is complicated and expensive.

Another technique that has been used to self-thread about a rotating head is to retract the rotating head assembly along with its mandrel, balloon the tape into the desired tape path, and replace the rotating head mandrel assembly. Typically, the tape is ballooned into the tape path by use of a vacuum. Subsequently, after the mandrel and rotating head assembly have been replaced in the tape path, the vacuum is removed and the tape collapses onto the mandrel ready for read/write operations. The primary shortcoming of this method is that alignment of a mandrel/rotating-head assembly relative to the tape is critical in high-density recording. Therefore, any movement of this mandrel/rotating-head assembly between a retracted and an active position requires extremely expensive mechanisms to insure the accuracy of positioning of the mandrel/rotating-head assembly in the active position.

Yet another method of threading tape helically about a rotating head mandrel would be to channelize the path about the mandrel, place a strong vacuum on the take-up side of the mandrel, and then draw the tape through the channelized path about the mandrel with the vacuum. The shortcoming of this method is that the volume of air flow is such that strong fluttering of the tape end during threading usually occurs. Consequently, damage to the tape end after a large number of threads can cause the tape to be unreliable in the threading operation.

It is the object of this invention to reliably, and simply, thread tape by pushing the tape through the constrained path.

SUMMARY OF THE INVENTION

In accordance with this invention, the above object has been accomplished by pushing the tape with the supply spool. Tape is held against each outer wrap of the spool as it unwinds so that the spool can push the tape. The holding force is preferably a large circular air flow about the spool in the unwinding direction. Further, flutter by the tape leading edge is controlled by passing the tape exiting the spool through a narrow throat and venting the large air flow away from the throat.

As a further feature of the invention, the tape is constrained so that it does not buckle and will follow the desired thread path. The constraint is by physical channels or by pneumatics. This constrained path, in combination with the push force from the spool, allows the tape to be push-threaded over a circuitous path such as helically about a mandrel.

The great advantage of our invention is the great reliability by which tape may be threaded along a helical path. The threading operation can accomplish thousands of threads with minimal damage to the end of tape. Further, the tape leading edge need not have a stiff leader. The tape leading edge may merely be the end of conventional magnetic tape.

The foregoing and other objects, features and advantages of the invention will be apparent from the following more particular description of the preferred embodiment of the invention, as illustrated in the accompanying drawings.

PUSH-THREADING APPARATUS

Figures 1, 2:
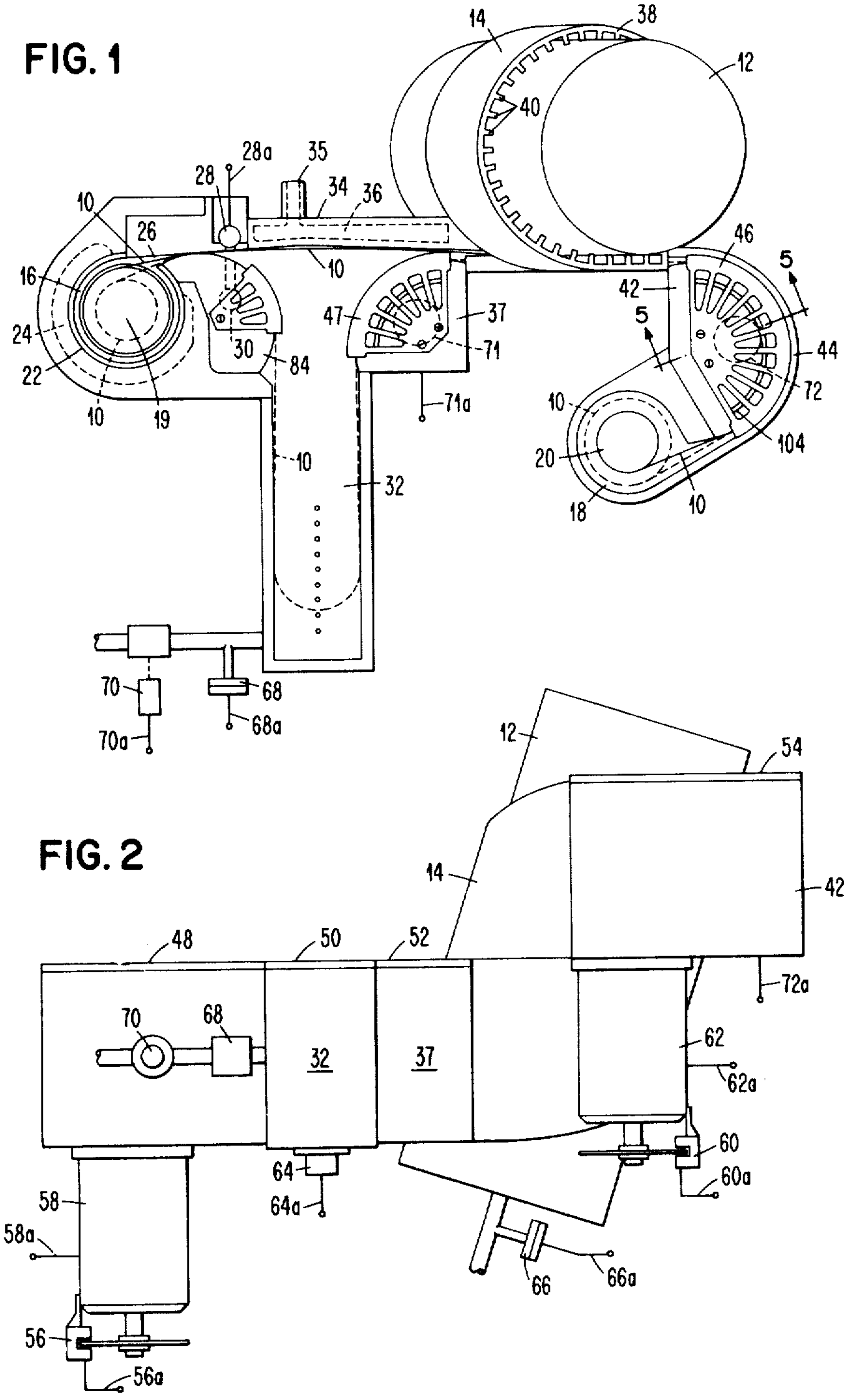
FIGS. 1 and 2 show top and front views of the apparatus used in the push-threading of the tape along the helical path.

Now referring to FIG. 1 mechanical elements of the push-threading apparatus are shown. The rotating head about which the tape 10 must be threaded is located in the middle of the mandrel 12. The rotating head is covered by the helical channel 14 which aids the threading of the helical path. A detailed description of the tape transport with the self-threading apparatus removed is in copending commonly assigned application Ser. No. 375,966, filed July 2, 1973, entitled "Tape Transport for Magnetic Recording with a Rotating Head," invented by P. J. Arseneault and E. P. Kollar.

As shown in FIG. 1, the push-threading apparatus is complete except that top covers have been removed from the vacuum column and the bearings, that precede and succeed the mandrel 12, so as to more clearly show the internal apparatus. Top covers for the apparatus are shown in the front view of the transport, as depicted in FIG. 2.

Proceeding from the supply spool cavity 16 to the take-up cavity 18, the threading apparatus is constructed in the following manner. Note that in the threading apparatus tape 10 is depicted in solid lines when it has just completed attachment to take-up hub 20, and is depicted in dashed lines after it has been fully loaded and has been run forward most of its length onto the take-up hub.

Figure 3:
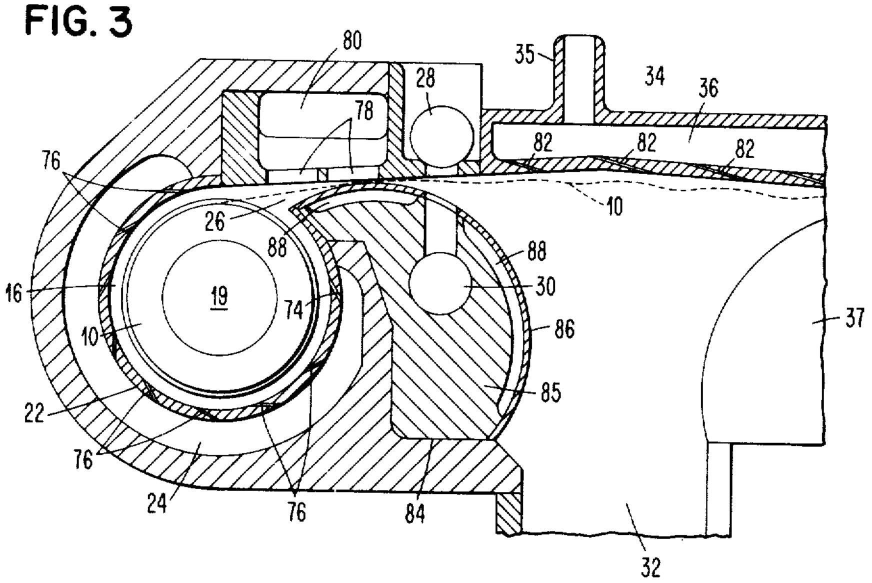
FIG. 3 is a detail of the thread path in the immediate vicinity of the supply spool where the tape leading edge must be picked off, exited through a confined throat into the tape path, and across a vacuum column.

The spool cavity 16 has an outer wall 22 which contains air jets connected to plenum 24. These air jets are shown in FIG. 3 and will be discussed subsequently with respect to FIG. 3. Their function is to introduce a large flow of air to hold tape in the spool 19 tightly on the spool rather than allowing it to uncoil as the spool unwinds tape. In other words, the rotary motive force supplied by the spool is converted to a translational motive force on the tape rather than permitting the tape to uncoil within the cavity. The push force is provided by spool 19 while the air flow prevents the tape from uncoiling in the cavity. An additional jet is provided near the throat 26 of the cavity 16 to peel off the leading edge of the tape and introduce it into the throat 26 so that it may exit from the cavity into the tape path.

Positioned at the mouth of the throat 26 is an optical sensor 28 that picks up light from a light source 30 positioned on the opposite side of the tape. Thus, when sensor 28 is cut off from the light source 30 by the opaqueness of the tape, the optical sensor 28 indicates the tape has entered the tape path during the threading operation.

To carry the tape across the top of the vacuum column 32, air jets provide a pneumatic boundary to guide the tape by creating a Bernoulli effect along the inner suface of top plate 34. These jets are shown in FIG. 3, to be described subsequently. A plenum 36 is supplied air under pressure via port 35 and provides air to the jets in the top plate 34. The jets direct a flow of air across the bottom surface of the top plate 34 such that when the leading edge of tape 10 enters the region of the vacuum column 32, the leading edge will be carried across vacuum column 32 from the throat 26 to the air bearing 37 and into helical channels 14 by the Bernoulli effect. Although air jets in the top plate 34 do have a forward component to assist the tape in moving across the top of the vacuum column, most of the forward pressure to push the tape across the top of the vacuum column is due to the supply spool 19.

Once the leading edge of the tape 10 enters the helical channels 14, it is guided by the physical boundaries of the channels around the mandrel 12. Motive force for moving the tape in the channels around mandrel 12 is the pushing force supplied by the supply spool 19. The pushing force from the supply spool is able to push-thread the tape because the tape is constrained in a path by the jets across the top of the vacuum column 32 and by the helical channels 14 around mandrel 12. The helical channel 14 has sidewalls 38 with posts 40 separated by open space. Channel 14 is preferably molded from plastic so that with the open space between posts 40, the channel is easily wrapped about the mandrel 12 to form the helical channel to guide the tape 10. Preferably the corners of the leading edge of tape are rounded so they will not catch on one of the posts 40.

From the helical channel 14, the tape passes around air bearing 42 to the take-up spool 20. Tape is guided around the bearing 42 by channel 44. Compliant edge guide 46 for the tape is lifted out of the path of the tape by a solenoid inside the bearing 42 during the threading operation. Similarly, a solenoid 71 inside air bearing 37 lifts compliant edge guide 47 out of the path during threading.

As the leading edge of tape 10 enters the take-up cavity 18, it is attracted to the take-up hub 20 by a vacuum inside the take-up hub. Attachment of the leading edge of the tape to the take-up hub is discussed in the copending S. F. Cloud et al, application previously cross-referenced.

In FIG. 2, the tape transport and threading apparatus of FIG. 1 are viewed from the front. Top covers 48, 50 and 52 are shown for the spool cavity 16, vacuum column 32 and bearing 37 respectively. Top cover 54 covers both bearing 42 and take-up cavity 18.

Figure 5:
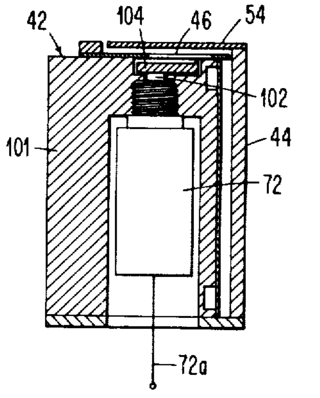
FIG. 5 shows a detail of a solenoid guide-lifter for lifting edge guides out of the tape path during threading.

Also shown in FIGS. 1 and 2 are various solenoid and sensor connections used by the electonics in controlling the threading operation. Of primary inportance is the tachometer 56 attached to the spool motor 58. By monitoring the signal from the tachometer 56, the position of the leading edge of the tape can be detected during the threading and unloading operation. A tachometer 60 is also provided at the take-up motor 62 to sense movement of the take-up hub 20. Additional sensors include the optical tape sensor 28, shown in FIG. 1; the vacuum column tape loop position sensor 64, in FIG. 2; the mandrel pressure sensor 66, in FIG. 2; the column vacuum sensor 68, in FIGS. 1 and 2. Solenoids used during the control of the threading operation include the vacuum valve solenoid 70, and two lift guide solenoids 71 and 72. The lift guide solenoids are inside air bearings 37 and 42 respectively. One of the solenoids (solenoid 72) is shown in FIG. 5 to be described hereinafter.

The manner in which the supply spool is able to push the tape through the helical path is best understood by reference to FIG. 3. FIG. 3 is a section taken through the spool cavity 16, the throat 26 from the spool cavity to the top of the vacuum column, and across the top of the vacuum column 32.

Spool 19 is automatically loaded into the spool cavity 16 by apparatus not shown. During the loading of the spool 19 into the spool cavity 16, the spool motor drives the spool in the reverse or backward direction. Backward direction is herein defined as winding the tape onto the spool, while forward direction is herein defined as winding the tape onto the take-up hub. The backward motion of the spool tends to keep the tape 10 tightly wrapped on the spool while the spool is entering the cavity 16.

When the start thread operation is initiated, spool 19 is driven in the forward direction and an air jet 74 pointed in the direction opposite to forward motion picks the tape leading edge off the spool and directs it out the throat 26 of the spool cavity 16. Pressurized air for air jet 74 is supplied via the plenum 24.

To prevent the tape 10 from unspooling in the cavity when the spool 19 is rotating in the forward direction, a plurality of air jets 76 are spaced around the spool cavity 16 and are directed in the forward direction. These are not merely lubricating air jets to provide a film of air between the tape and the walls of the spool cavity 16. The function of the jets 76 is to provide a large volume of air flow directed forward and toward the spool so that the tape on the spool is constrained to wrap the spool rather than unspooling in the cavity 16 during forward motion of spool 19. This accounts for spool's ability to generate a force in pushing the tape through the helical path.

The nature of the air flow may best be understood by reviewing some of the physical parameters involved in the pushing of the tape by the spool 19. As shown in FIG. 3, the outside diameter of the last wrap of tape when the spool is fully loaded is approximately 4 centimeters. The inside diameter of the spool cavity 16 is approximately 4.6 centimeters. Accordingly, there is sufficient room for the tape to uncoil in the cavity during forward motion of the spool if the tape were not forced against the spool by the air jets 76. The volume of air flow applied to the plenum 24, which supplies the jets 76, is approximately 3 liters per second. From this data, it is clear that the flow of air in the spool cavity is very strong and is functioning to hold the tape on the spool so that the spool 19 may push the tape 10 through the helical path.

Another factor in the push-threading of the tape is the control of tape flutter so that the leading edge of the tape does not flutter so wildly that it might fold the tape into the vacuum column 32. As just pointed out, there is a large flow of air in the spool cavity 16. This flow of air could be vented through the throat 26 into the tape path by making the throat 26 larger. However, if this is done, the tape 10 will flutter with such a large amplitude that the leading edge may impinge on air bearing 37, and the tape will buckle into the column 32, rather than proceeding along the helical path.

To control the flutter of tape 10 as it passes across the top of vacuum column 32, it is necessary to vent a large portion of the air flow from spool cavity 16. A plurality of holes 78 are spaced across the width of the throat 26 at the top of the throat near the spool cavity 16. These holes are spaced across the width of the tape so that a large percentage of the air flow in the cavity 16 is exhausted out the holes 78 and through port 80. Further, the throat 26 is constricted so that only a small percentage of the air flow in the cavity 16 passes through throat 26. Thus, the combination of the large air flow in the cavity 16 to hold the tape against wraps of tape on the spool 19, and the vents 78 and 80 to bleed off the air from the constricted throat 26, provide a condition whereby tape 10 can be pushed with substantial force by the spool 19 and yet will not have a large amplitude flutter.

Yet another factor in push-threading the tape is that the tape path through which the tape is being pushed must constrain the tape within that path, but not impede forward motion of the tape. Without constraint, the leading edge of the tape would have no direction. The constraints used are of two types. First, most of the path is surrounded by a channel that guides the leading edge of the tape as it is pushed along by the spool 19. Second, that portion of the path that must cross open space is constrained by jets that produce a Bernoulli effect on the tape.

Referring again to FIG. 3, plenum 36 is pressurized to provide the air flow through jets 82 that produce the Bernoulli effect. In operation the flow of air from the jets 82 across the top of tape 10 creates a lower pressure above the tape than below the tape. Vacuum column 32 is at normal atmospheric pressure during threading. Thus, the tape 10 is carried across the open space above vacuum column 32 by the Bernoulli effect produced by air jets 82. Of course, there will be some waviness in the tape due to the flow of air across the top of the tape. A small amount of flutter of the tape can actually enhance the passage of the tape through the helical channel 14 (FIG. 1), since it will tend to prevent the tape from sticking to any particular portion of the channelized path.

Before leaving FIG. 3, some other elements will be described for background. First, the air bearing 84 is made up of a supporting core 85 to which a foil 86 is bonded. Foil 86 can be either porous or, preferably, has holes therein which interconnect to air pressure plenum 88. Air from air pressure plenum 88 flows through the foil 86 to provide the air bearing for the tape as it passes through throat 26 above foil 86. Further, when the tape is loaded in vacuum column 32, tape 10 wraps most of the bearing 84.

Finally, in FIG. 3 the position of the optical sensor 28 and light source 30 are shown. As discussed earlier, the function of the optical sensor 28 is to detect that the leading edge of the tape has exited the spool cavity and entered the tape path.

Figure 4A:
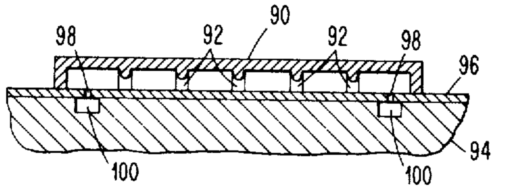
FIGS. 4*a* and 4*b* show alternative configurations for the channel that constrains the tape along its circuitous path about the rotating-head mandrel. The alternatives include a channel with or without ribs on the inner top surface of the channel.
Figure 4B:
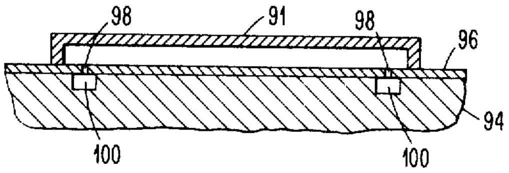

In FIGS. 4*a* and 4*b*, alternative configurations are shown for the channels that guide the tape as it is push-threaded. In the preferred embodiment in FIG. 4*a*, channel 90 has ribs 92 on its inner surface. The ribs 92 prevent the tape from making contact with a large area of the inner surface of the channel 90. Because of electrostatic charge, large area contact between the tape and the channel 90 can cause the tape to stick to the channel. Of course, if electrostatic charge is no problem, the channel may be implemented as channel 91 shown in FIG. 4*b* that contains no ribs.

Also shown in FIGS. 4*a* and 4*b* is the surface of air bearing 42. All surfaces including mandrel 12 (FIG. 1) and bearings 84 (FIG. 3) and bearings 37 and 42 (FIG. 1) along the tape path are air bearing. The air bearings are preferably implemented by providing a support member 94 to which a metal foil 96 is bonded. Foil 96 contains holes 98 in a predetermined pattern to provide the air bearing between the tape and the surface of the foils 96. Air is supplied to the holes 98 via the channels 100 in the support member 94.

As shown in FIG. 1, the air bearings 37 and 42 have compliant edge guides 46 and 47. To prevent these edge guidings from impeding the progress of the leading edge of the tape during threading, it is necessary to lift the guides 46 and 47 away from the edge of tape during the threading operation. In FIG. 5, solenoid 72 for lifting guide 46 is shown.

Solenoid 72 is mounted inside the support member for air bearing 42. When the solenoid is not active, plunger 102 is retracted into the solenoid because of pressure from the compliant guide 46 via guide lifter 104. When solenoid 72 is activated, plunger 102 extends out from the solenoid, lifts the guide lifter 104 which in turn lifts the compliant edge guide 46. The leading edge of the tape will then pass around air bearing 42 and not be impeded by the edge force of guide 46.

It will be appreciated by one skilled in the art that various pieces of hardware could be substituted for applicant's preferred embodiment while still accomplishing the objective of push-threading a limp web through a circuitous path. Herein, the push-threading has been accomplished by holding the limp web coiled on a spool while the spool rotates, whereby the spool may push the limp web forward. Further, the amount of flutter or vibration in the web along the circuitous path should be controlled, but not necessarily eliminated. Finally, the circuitous path should provide low impedance to the limp material while still constraining the limp material within the path so that the limp web may easily move along the path.

What is claimed is:

1. Apparatus for threading a web from a supply spool along a circuitous path having physical and pneumatic boundaries to guide the web during threading without impeding movement of the web, said apparatus comprising:

means for rotating the spool forward to supply the web to the circuitous path;

means mounted adjacent the spool for picking the web leading edge off of the spool and directing the leading edge into the circuitous path;

means mounted adjacent the spool for directing a large flow of air in a circular motion about the spool in the direction of forward web motion;

means mounted adjacent the spool for confining the large circular flow of air to a region immediately adjacent the outer wrap of the web on the spool, the flow of air being large enough in cooperation with said confining means to restrain the uncoiling of the web about the spool whereby forward rotation of the spool pushes the web along the circuitous path rather than uncoiling the web;

means positioned where the web enters the circuitous path for venting the large circular flow of air away from the web so that the large flow of air does not accompany the web along the path.

2. The apparatus of claim 1 wherein said picking means comprises:

jet means for blowing air against the forward motion of the spool to pick off the web leading edge from the spool and direct the leading edge into the circuitous path.

3. The apparatus of claim 1 wherein said confining means and directing means respectively include:

cylindrical cavity surrounding the spool with the inner surface of the cavity less than .5 centimeter from the outer wrap of the web on the spool;

a plurality of air jets mounted in the walls of said cavity for supplying a circular air flow between the spool the the inner surface of the cavity where the total air flow applied to the jets is in excess of a liter per second.

4. Apparatus for self-threading magnetic tape about a rotating magnetic head comprising:

a channelized path for guiding the leading edge of the tape about the rotating head without impeding the forward motion of the tape;

a tape supply spool recessed in a cavity for pushing tape out of the cavity and through said channelized path when the spool is rotated forward;

a throat connecting the cavity with said channelized path for guiding the leading edge of the tape from the cavity to said channelized path;

air jets in the walls of said cavity for providing a large air flow forward in the direction of rotation of the spool and toward the axis of the spool, said air jets limiting the unspooling of the tape in the cavity whereby forward rotation of the spool pushes the tape through the channelized path;

air exhaust ports adjacent said throat for bleeding off the large air flow from the cavity before the air flow enters the throat and channelized path.

5. The apparatus of claim 4 wherein the cross-sectional area of said throat is much smaller than the cross-sectional area of said air exhaust ports whereby a substantial portion of the air flow in the cavity is diverted from the channelized path.

6. The apparatus of claim 5 wherein the separation between tape on said supply spool and the walls of the cavity is in the order of millimeters, while the flow of air from said air jets is at least a liter per second.

7. Method for self-threading magnetic tape along a circuitous path from a tape supply spool comprising the steps of:

pushing the tape along the circuitous path with rotary motive force from the tape supply spool;

constraining the tape to the circuitous path physically or pneumatically while not impeding the forward motion of the tape whereby the tape is guided along the path without buckling;

directing a large flow of air at the spool and in circular motion about the spool to constrain the uncoiling of the tape about the spool so that the rotary motive force from the supply spool is converted into translational motive force on the tape;

venting the large flow of air away from the tape as the tape leaves the spool and enters the circuitous path whereby tape flutter during the threading operation is controlled.

* * * * *

UNITED STATES PATENT OFFICE

CERTIFICATE OF CORRECTION

PATENT NO. : 3,918,092

DATED : November 4, 1975

INVENTOR(S) : W. J. Rueger

It is certified that error appears in the above-identified patent and that said Letters Patent are hereby corrected as shown below:

Col. 4, line 9, "electonics" should be --electronics--;

line 10, "inportance" should be --importance--;

Claim 3, Col. 7, line 36, "the the" should be --and the--.

Signed and Sealed this

Twentieth Day of July 1976

[SEAL]

Attest:

RUTH C. MASON
*Attesting Officer*

C. MARSHALL DANN
*Commissioner of Patents and Trademarks*